United States Patent
Chiu et al.

(10) Patent No.: US 11,301,359 B2
(45) Date of Patent: Apr. 12, 2022

(54) REMOTE DEBUGGING PARALLEL REGIONS IN STREAM COMPUTING APPLICATIONS

(71) Applicant: International Business Machines Corporation, Armonk, NY (US)

(72) Inventors: Henry Chiu, San Jose, CA (US); Bradley William Fawcett, Byron, MN (US); Jingdong Sun, Rochester, MN (US); Jason A. Nikolai, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 198 days.

(21) Appl. No.: 16/736,364

(22) Filed: Jan. 7, 2020

(65) Prior Publication Data
US 2021/0209001 A1    Jul. 8, 2021

(51) Int. Cl.
*G06F 11/36*    (2006.01)

(52) U.S. Cl.
CPC ...... *G06F 11/3628* (2013.01); *G06F 11/3664* (2013.01)

(58) Field of Classification Search
None
See application file for complete search history.

(56) References Cited

U.S. PATENT DOCUMENTS

| | | | |
|---|---|---|---|
| 5,193,187 A | 3/1993 | Strout, II et al. | |
| 7,222,264 B2 | 5/2007 | Muratori et al. | |
| 7,865,883 B1 | 1/2011 | Sistare et al. | |
| 8,924,939 B2 * | 12/2014 | Branson | G06F 11/3636 717/128 |
| 9,946,631 B1 * | 4/2018 | Cook | G06F 16/24568 |
| 10,025,827 B1 * | 7/2018 | Fawcett | G06F 9/5077 |
| 11,113,181 B2 * | 9/2021 | Cook | G06F 11/3664 |
| 2002/0104071 A1 * | 8/2002 | Charisius | G06F 8/33 717/109 |
| 2006/0150007 A1 | 7/2006 | Gostynski et al. | |
| 2007/0294671 A1 * | 12/2007 | Demetriou | G06F 11/3664 717/124 |

(Continued)

OTHER PUBLICATIONS

McDowell et al., "Debugging concurrent programs," ACM Computing Surveys, vol. 21, Issue 4 (Dec. 1989), pp. 593-622.

*Primary Examiner* — Philip Wang
(74) *Attorney, Agent, or Firm* — Garg Law Firm, PLLC; Rakesh Garg; William Hartwell

(57) ABSTRACT

A method, system and computer program product for facilitating remote debugging of parallel regions in stream computing applications. A stream computing management server (SCMS) communicates a list of processing elements to a debugging interface. Responsive to setting a debugging breakpoint for a processing element of the list of processing elements, the SCMS receives a command to enable remote debugging for the selected processing element. In this regard, the processing element is a part of a parallel channel in a distributed processing environment. The SCMS maps the processing element to an attachment information in the distributed environment. The SCMS dynamically attaches a remote debugger to the processing element based on the attachment information.

17 Claims, 9 Drawing Sheets

(56) References Cited

U.S. PATENT DOCUMENTS

| | | | |
|---|---|---|---|
| 2011/0191747 A1* | 8/2011 | Charisius | G06F 8/20 |
| | | | 717/103 |
| 2012/0137178 A1* | 5/2012 | Barsness | G06F 11/362 |
| | | | 714/35 |
| 2012/0151446 A1* | 6/2012 | Sathya | G06F 11/3656 |
| | | | 717/125 |
| 2015/0007144 A1* | 1/2015 | Barsness | G06F 11/3636 |
| | | | 717/129 |
| 2016/0092345 A1* | 3/2016 | Branson | G06F 11/362 |
| | | | 717/129 |
| 2016/0344605 A1* | 11/2016 | Branson | G06F 11/3664 |
| 2016/0371171 A1* | 12/2016 | Barsness | G06F 11/362 |
| 2016/0381129 A1* | 12/2016 | Barsness | H04L 41/5054 |
| | | | 709/226 |
| 2017/0060959 A1* | 3/2017 | Cradick | G06F 16/24568 |
| 2017/0153966 A1* | 6/2017 | Cao | G06F 11/3688 |
| 2017/0308458 A1* | 10/2017 | Cancilla | G06F 11/3664 |
| 2018/0083839 A1* | 3/2018 | Fawcett | H04L 41/20 |
| 2018/0129582 A1* | 5/2018 | Cook | G06F 11/3664 |
| 2018/0203791 A1* | 7/2018 | Gaba | G06F 11/3664 |
| 2018/0210813 A1* | 7/2018 | Barsness | G06F 11/3636 |
| 2018/0302275 A1* | 10/2018 | Fawcett | H04L 41/0803 |
| 2019/0207990 A1* | 7/2019 | Cook | H04L 43/026 |
| 2019/0317823 A1* | 10/2019 | Koster | G06F 8/656 |
| 2020/0106833 A1* | 4/2020 | Konik | G06F 11/3041 |
| 2020/0228587 A1* | 7/2020 | Fawcett | H04L 41/0813 |

\* cited by examiner

REMOTE DEBUGGING PARALLEL REGIONS IN STREAM COMPUTING APPLICATIONS

TECHNICAL FIELD

The present invention relates generally to a method, system, and computer program product for debugging an application. More particularly, the present invention relates to a method, system, and computer program product for remote debugging parallel regions in stream computing applications.

BACKGROUND

A stream computing system is a high-performance computer system that analyzes multiple data streams from many sources in real time. The work stream in stream computing is used to mean pulling in streams of data, processing the data and streaming the data back out as a single flow. Data is ingested from one or more sources and then passed to functions, called operators, which perform some action on or with the data. When one operator completes processing on the data, the data (or tuples) are passed to the next operator in an operator graph.

Large amounts of data may require spreading of the data across duplicate operators. To avoid code duplication, a parallel region is constructed. A parallel region is composed of parallel channels, where each channel is an independent set of replicated operator(s). Parallel channels can contain multiple operators, with multiple input and output streams. The application code is written statically once and then deployed to run several channels duplicating the code functionality across these parallel channels. The number of channels in a parallel region is determined by a width parameter that is set by a developer.

Stream computing uses software algorithms that analyze the data in real time as it streams in to increase speed and accuracy when dealing with data handling and analysis. Development of a stream application includes creating source code, which may include many thousands of lines of instructions. The source code is converted into an executable program or machine code using a compiler. Computer programs, especially new ones, typically contain errors, commonly referred to as "bugs." Application data is analyzed by a programmer at run time by using a computer program, commonly referred to as a "debugger", which allows developers to find and correct bugs in the executing stream computing application without having to modify code by adding tracing and re-executing the application. Traditional features include attaching to a process, stepping through code, suspending execution at breakpoints, and examining memory values. A debugger allows the programmer to execute the stream computing application under the control of the debugger, allowing the process to be monitored.

SUMMARY

Embodiments of the invention are defined by the claims below, not this summary. A high-level overview is provided here to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

The illustrative embodiments provide a method, system, and computer program product. An embodiment includes a method that communicates, by a stream computing management server (SCMS), a list of processing elements to a debugging interface. An embodiment receives, by the SCMS, responsive to setting a debugging breakpoint for a processing element of the list of processing elements, a command to enable remote debugging for the selected processing element. In this regard, the processing element is a part of a parallel channel in a distributed processing environment. An embodiment maps, by the SCMS, the processing element to an attachment information in the distributed environment. An embodiment dynamically attaches, by the SCMS, a remote debugger to the processing element based on the attachment information.

An embodiment includes a computer usable program product. The computer usable program product includes one or more computer-readable storage devices, and program instructions stored on at least one of the one or more computer-readable storage devices.

An embodiment includes a computer system. The computer system includes one or more processors, one or more computer-readable memories, and one or more computer-readable storage devices, and program instructions stored on at least one of the one or more computer-readable storage devices for execution by at least one of the one or more processors via at least one of the one or more computer-readable memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
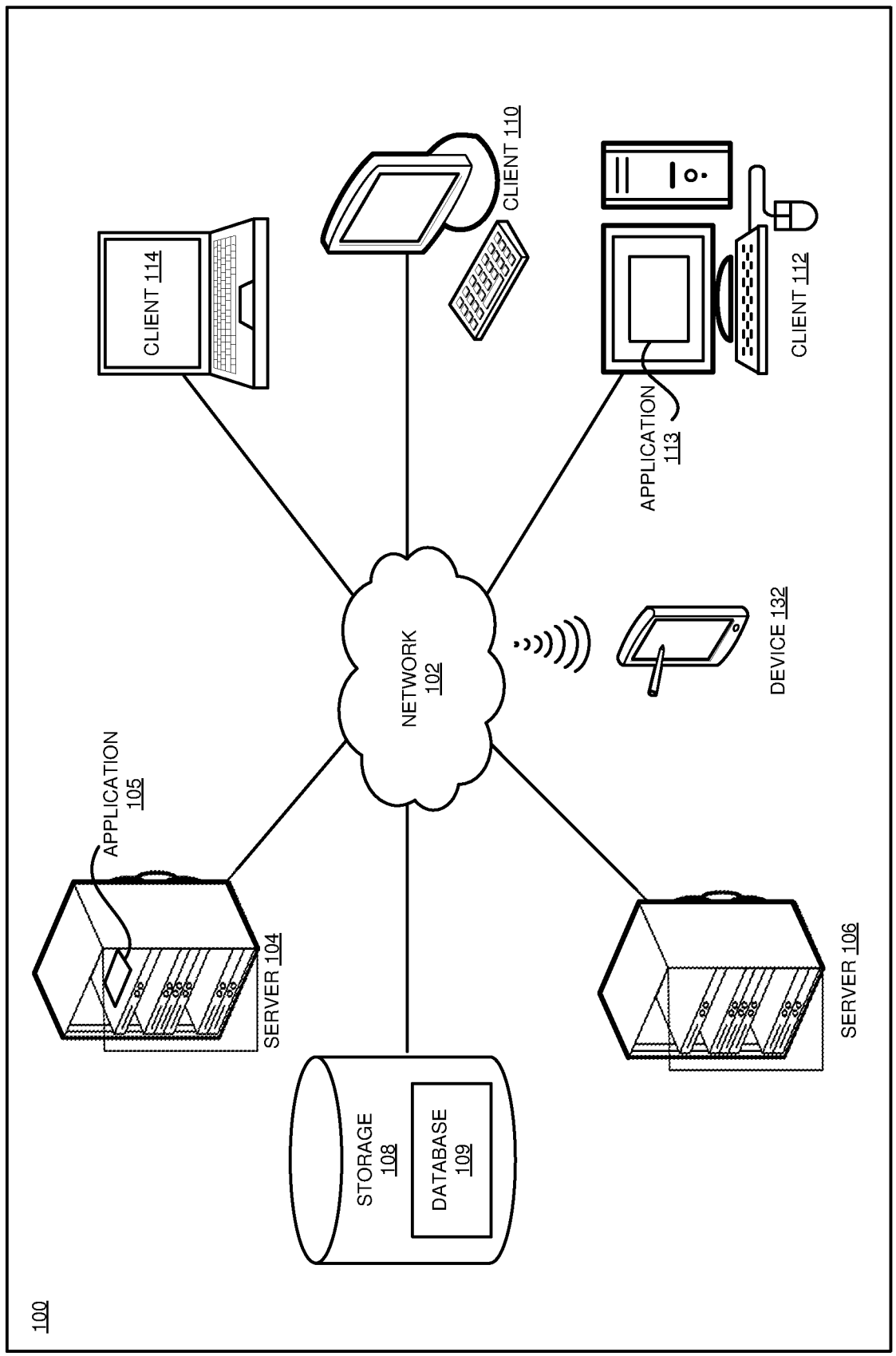
FIG. 1 depicts a block diagram of a network of data processing systems in which illustrative embodiments may be implemented.

The illustrative embodiments recognize that there is a need to facilitate remote debugging of parallel regions in stream computing applications. Current debug technology does not account for parallelism of processing elements, which include operators. This is especially noted with respect to debugging stream computing applications having parallel regions having replicated operators. For example, when a developer creates a stream application, a stream computing management system (SCMS) initially divides the application into its component operators. The SCMS then combines the operators to form processing elements (PE) processes. In line with a distributed computing environment, the SCMS places the PE's in different processing nodes. In this regard, the developers are only privy to their application code and its component operators. Unlike the case of a single server environment, where the PE's are distributed within the same device, developers of stream applications under a distributed environment are not privy to the particular placement (i.e., locations) of the various PE's.

The illustrative embodiments recognize that a typical remote debugging environment requires a substantial amount of developer setup before being able to execute a runtime debugging operation of a stream computing application. The developer would require knowledge of the actual location of the server running the stream computing application. Then, the developer would require the opening of a debugging port for the remote debugger to permit the debugger to attach to the PE. When stream computing application is executed in a distributed computing environment, such as a cloud computing environment, it is very difficult for a developer to ascertain the actual locations of the PE's. By extension, the developer would be unable to open a debugging port to allow for attachment to the various PE's that are spread out across the distributed environment.

In addition, the illustrative embodiments recognize that typical remote debugging environments include displaying disjointed, multi-view operator graphs to a developer. This disjointed view of the operators in a distributed computing environment makes it more difficult for the developer to decide whether to place breakpoints at a particular PE.

Moreover, the illustrative embodiments recognize that there are instances in conventional debugging operations when a change in the state of the runtime execution of a PE in a stream computing application causes the interruption of the debugging operation. Typically, such an interruption stops the sequential execution of healthy PE's. This interruption becomes more acute in a distributed stream computing environment, since the resumption of debugging operations require re-attachment to a new remote process. The illustrative embodiments recognize that without the ability to readily keep track of where each PE is running in the distributed environment, debugger re-attachment to a new remote process at a different location becomes increasingly less likely to occur.

Lastly, the illustrative embodiments recognize that there are instances in parallel stream computing when the developer wishes to set breakpoints for debugging an operator in a particular parallel channel. However, when a breakpoint is set in an operator that has been replicated numerous times in a physical environment that distributes these replicated operators across different processing nodes, it is difficult to ascertain whether the developer intends to set a breakpoint in all replicated operators of a parallel region, or just a replicated operator in a specific parallel channel.

The illustrative embodiments recognize that the presently available solutions do not address these needs or provide adequate solutions for these needs. The illustrative embodiments used to describe the invention generally address and solve the above-described problems and other problems related to remote debugging in parallel regions of a distributed, stream computing application.

An embodiment can be implemented as a software application. The application implementing an embodiment can be configured as a modification of an existing SCMS and remote debugger, as a separate application that operates in conjunction with an existing SCMS and remote debugger, a standalone application, or some combination thereof. Particularly, some illustrative embodiments provide a method that facilitates remote debugging of parallel regions in stream computing applications operating in a distributed computing environment.

An embodiment configures a server-side, SCMS to keep track of which processing node(s) execute particular PE's, the location of each processing node (also sometimes referred to as a processing host or computing host), and open a debugging port for a remote debugger to attach to the PE(s). The processing node can be characterized as at least one member from a set that includes a physical machine, a virtual machine, and a container. The PE processes can be Linux processes, Unix processes, or processes written for other suitable server operating systems. The location of each PE in a distributed, stream computing environment can vary greatly. For example, a PE region can have each replicate PE instance located in a different processing host that is accessible via a different debugging port. Such a configured SCMS facilitates a remote debugger program to dynamically attach to PEs of distributed parallel channels through a particular debugging port.

The SCMS communicates a list of PE's to a debugging interface at a developer side. Responsive to a developer setting a debugging breakpoint for a PE(s) drawn from the communicated list, the SCMS receives a command to enable remote debugging for the selected processing element. In this regard, the PE containing the set breakpoint forms part of a parallel channel in a distributed processing environment. The SCMS performs a lookup of the PE and maps the PE to attachment information in the distributed environment. The attachment information includes a physical or virtual location of the PE and a debugging port of the PE, or some combination thereof. Once the attachment information is ascertained by the SCMS, the SCMS dynamically attaches the remote debugger on the developer, client side to the PE based on the attachment information. The dynamic attachment allows the debugging operation of the running PE to proceed.

Another embodiment configures a developer-facing (i.e., client-side), debugging interface to allow a developer to view a single pane view of a set of active PE's in a distributed, stream computing application. The SCMS communicates to the debugging interface a consolidation of a set of active PE's of a stream computing application to cause the single-pane view of PE's executed across a plurality of mutually remote processing nodes.

Another embodiment configures a SCMS to keep track of state changes in the debugging operations at runtime. Examples of a state change includes, but is not limited to an abnormal termination of a PE, a runtime refusion of PE's, and a change in a number of parallel channels of a parallel region. The state changes are monitored by the SCMS and stored in a state database such that the SCMS can automatically send updated reattachment information to the remote debugger upon detection of the state change.

Another embodiment configures a SCMS to respond to a developer's setting of a debugging breakpoint for a PE in instances when the selected PE has replicated into a set of identical operators. Under such conditions, the SCMS sends a notification of the replicated state of the PE and requests additional clarification regarding whether the developer intended to set breakpoints on all or a subset of the PE's intended for debugging. Once the SCMS has received the additional clarification from the developer, the SCMS can acquire the correct attachment information to cause attachment to the intended PE replicate(s).

In view of the foregoing embodiments, the debugging of PE's in parallel regions of a stream computing application is facilitated. The examples described herein of enhancing the debugging operations of a stream computing application are not meant to be limiting in any way. From this disclosure, those of ordinary skill in the art will be able to conceive many other ways of implementing the enhanced remote debugging operations of PE(s) in parallel regions of stream computing applications. and the same are contemplated within the scope of the illustrative embodiments.

The manner of debugging PE(s) in parallel region(s) of a stream computing application as described herein is unavailable in the presently available methods in the technological field of endeavor pertaining to debugging PE's of parallel regions. A method of an embodiment described herein, when implemented to execute on a device or data processing system, comprises substantial advancement of the functionality of that device or data processing system by providing a centralized, stream computing server that maintains a real-time accounting of the locations of PEs, despite possible state changes, and automatically retrieves attachment/reattachment information to facilitate a remote debugger to attach to a PE that was intended by a developer to be debugged.

The illustrative embodiments are described with respect to certain types of processing elements, operator graphs, SCMSes, debugger programs, computer memories, storage devices, containers, stream computing systems, cloud computing systems, virtual computing systems, operating systems, computing systems, server systems, data processing systems, networked computing environments, devices, other environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data instruction, data source, instruction source, access to a data source over a data network, or access to an instruction source over a data network. Any type of storage device may provide the data or instruction to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable computing devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
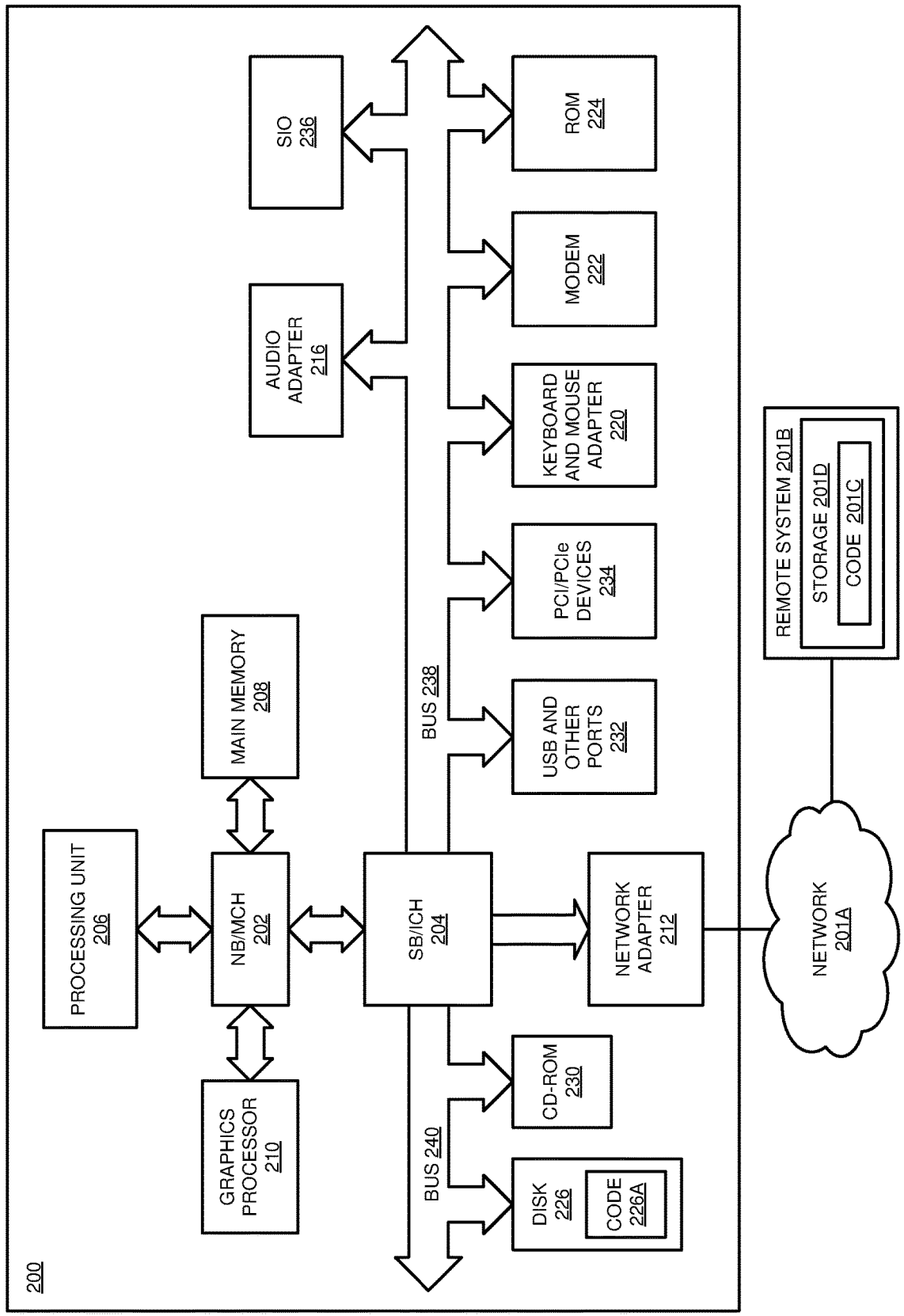
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment is distributed across several data processing systems and a data network as shown, whereas another embodiment is implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 on a server-side implements an embodiment described herein. According to one embodiment, the application 105 keeps track of which processing node(s) execute particular PE's, the location of each processing node, opens a debugging port for a remote debugger to attach to the PE(s), and facilitates a remote debugger program to dynamically attach to PEs of distributed parallel channels through a particular debugging port. According to another embodiment, the application 105 communicates a list of PE's to a debugging interface at a developer side, enables remote debugging for a PE selected by a developer setting a debugging breakpoint for the PE(s) drawn from the communicated list, performs a lookup of the PE and maps the PE to attachment information in the distributed environment, and dynamically attaches the remote debugger based on the attachment information. According to another embodiment, the application 105 communicates to a debugging interface a consolidation of a set of active PE's of a stream computing application to cause the single-pane view of PE's executed across a plurality of mutually remote processing nodes. According to another embodiment, the application 105 monitors state changes in debugging operations at runtime, stores the state changes in a state database, and automatically sends reattachment information to the remote debugger upon detection of the state change. According to another embodiment, the application 105 responds to a developer's setting of a debugging breakpoint for a PE in instances when the selected PE has replicated into a set of identical operators, sends a notification of the replicated state of the PE and requests additional clarification regarding whether the developer intended to set breakpoints on all or a subset of the PE's intended for debugging, and acquires the correct attachment information to cause attachment to the intended PE replicate(s) upon receipt of the additional clarification.

In other embodiments described herein, application 113 is implemented on a client-side (e.g., in clients 110-114, and device 132). According to one embodiment, application 113 provides a developer-facing interface to allow the developer to set a debugging breakpoint for a PE(s) drawn from a communicated list and sends a command for enabling remote debugging for the selected PE. Application 113 includes a remote debugger that is attached to a selected PE. According to another embodiment, application 113 includes a developer-facing (i.e., client-side), debugging interface to allow a developer to view a single pane view of a set of active PE's in a distributed, stream computing application by receiving a consolidation of a set of active PE's of a stream computing application. According to another embodiment, application 113 is configured to receive a developer's setting of a debugging breakpoint for a PE in instances when the selected PE has replicated into a set of identical operators, and responds to requests for additional clarification regarding whether the developer intended to set breakpoints on all or a subset of the PE's intended for debugging.

A database 109, such as a state database for tracking changes in a state of a running steam computing application, may be stored in storage 108 as shown or supplied by another source (not shown). Application 105 can also execute in any of data processing systems 104, 106, 110, 112, and 114. Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, containers, and services) that can be rapidly provisioned and released with minimal management effort or interaction with a provider of the content or service.

With reference to FIG. 2, this figure depicts a block diagram of a data processing system 200 in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as client-side application 113 or server-side application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
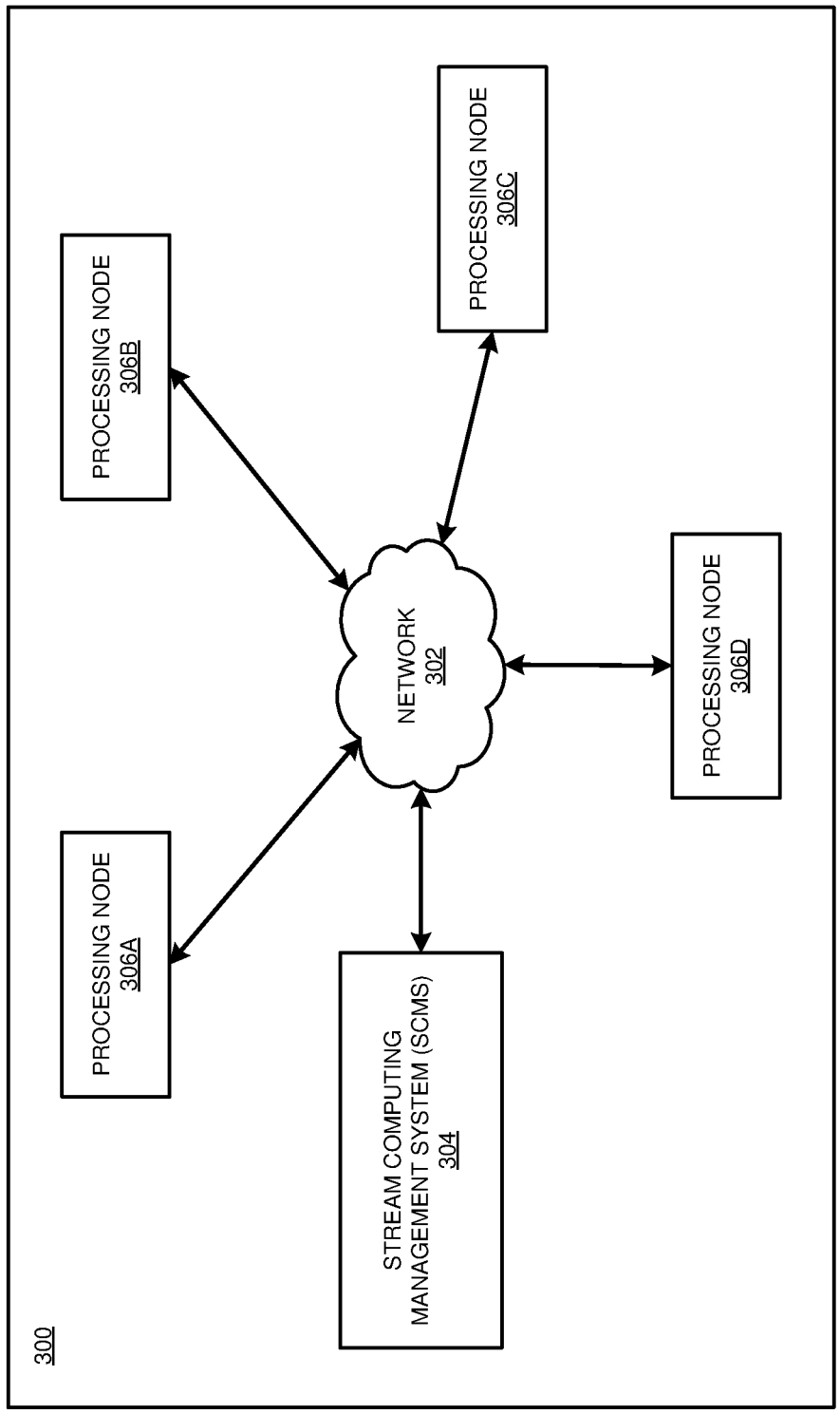
FIG. 3 depicts a block diagram of a stream computing infrastructure configured to execute a stream application in which illustrative embodiments may be implemented.
Figure 5:
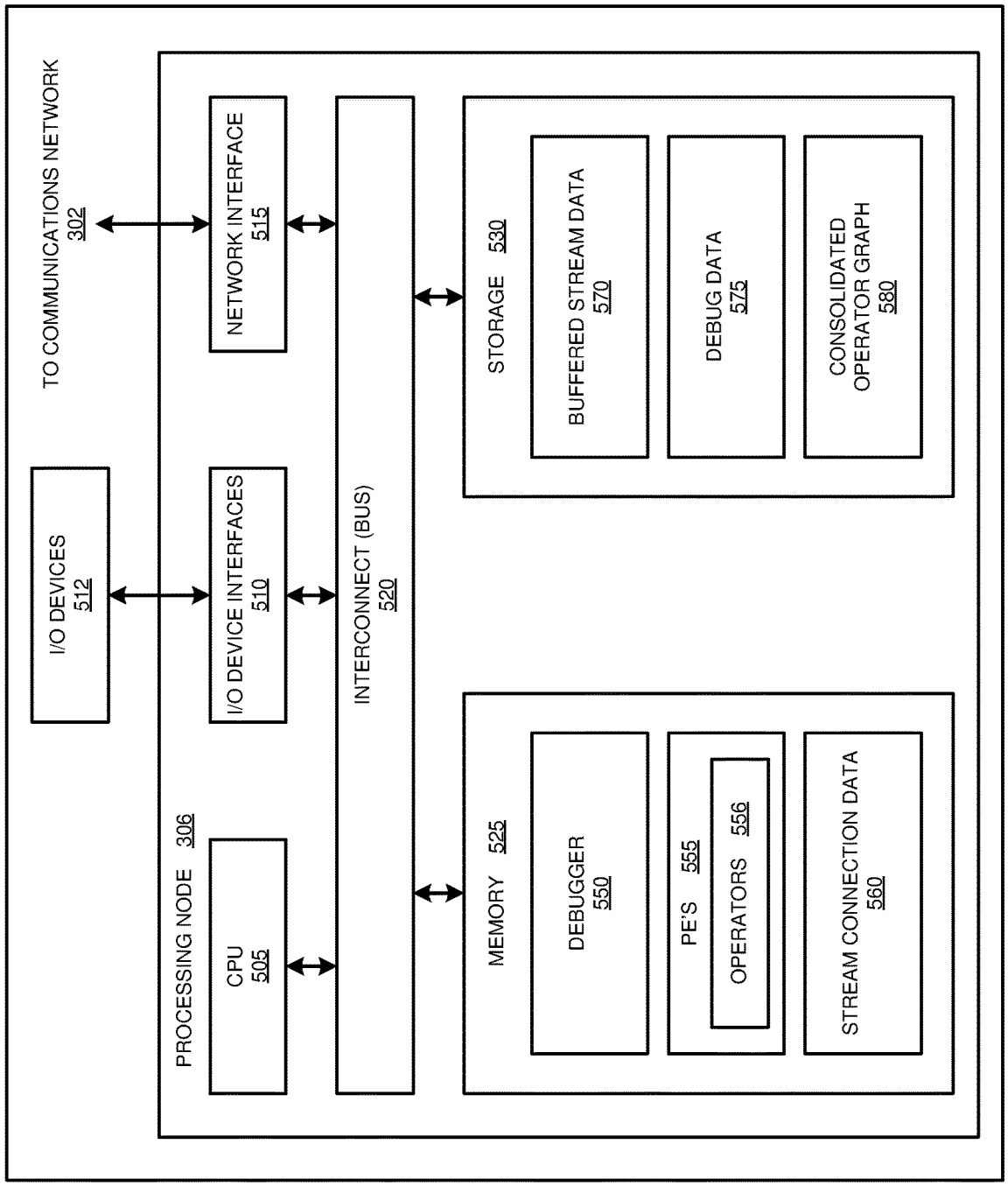
FIG. 5 depicts a more detailed view of a distributed processing node of FIG. 3, in accordance with an illustrative embodiment.
Figure 6:
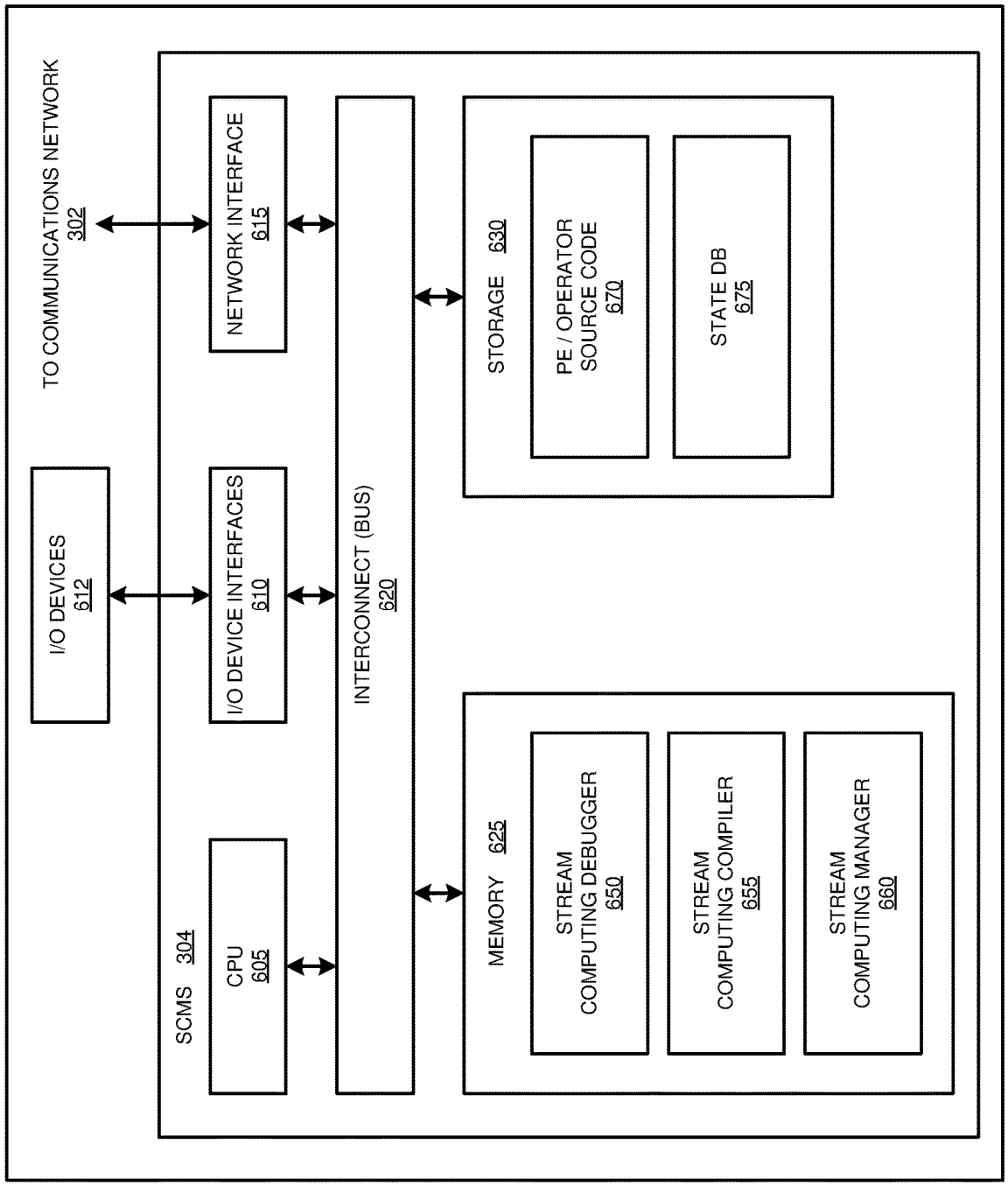
FIG. 6 depicts a more detailed view of a stream computing management system (SCMS) of FIG. 3, in accordance with an illustrative embodiment.

With reference to FIG. 3, an example of a networked computing infrastructure 300 configured to execute a stream computing application, according to one embodiment of the invention. As shown, the networked computing infrastructure 300 includes a SCMS 304 and a plurality of processing nodes 306a-d, each connected to a communications network 302. Processing nodes 306a-d performs any of the functions described above with respect to application 113. Further detail regarding additional components of processing nodes 306a-d is described below with respect to what is depicted in FIG. 5. SCMS 304 performs any of the functions described above with respect to application 105 of FIG. 1. Further detail regarding additional components of SCMS 304 is described below with respect to what is depicted in FIG. 6.

Figure 4:
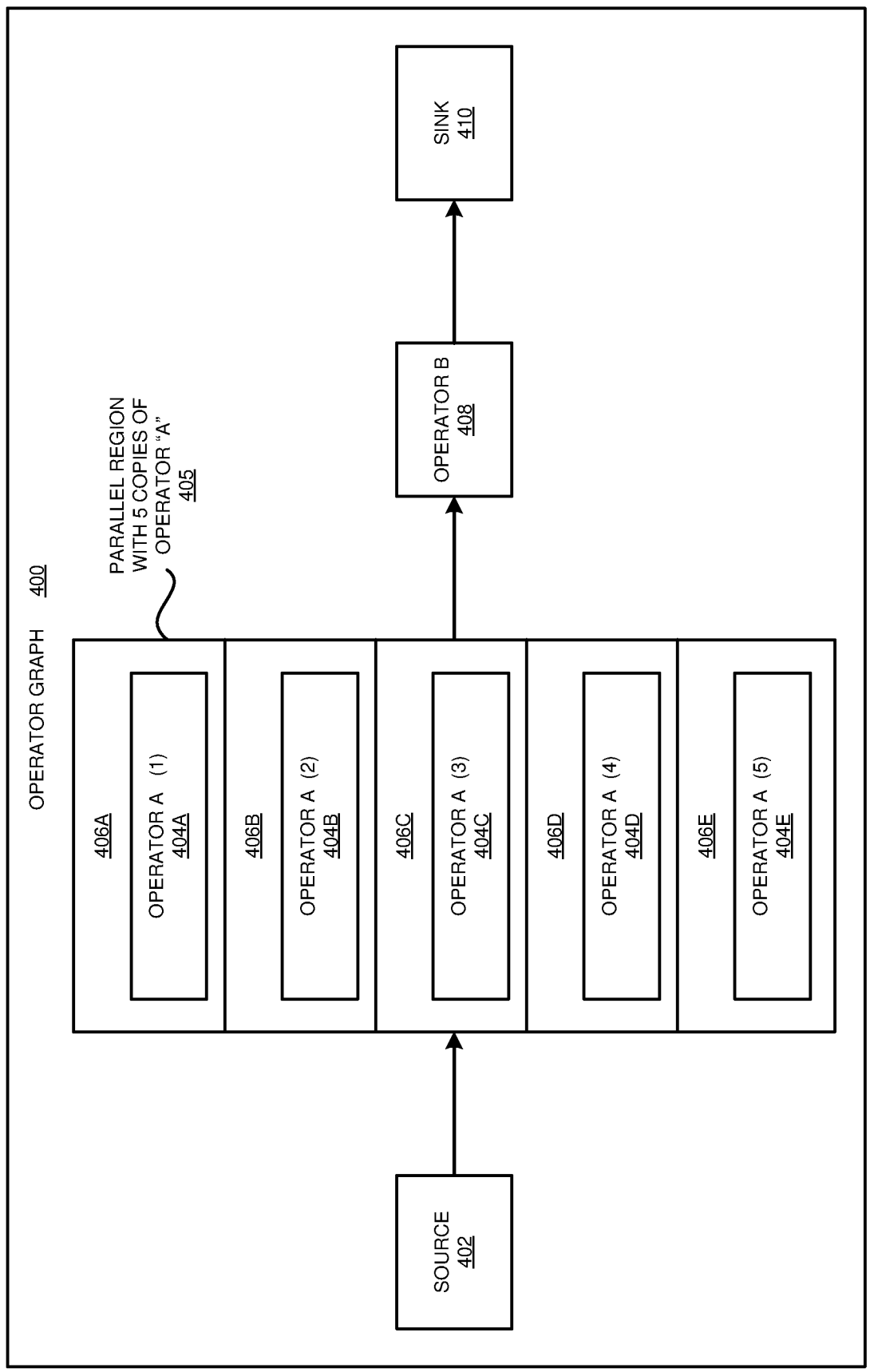
FIG. 4 depicts a block diagram of an example operator graph using which illustrative embodiments may be implemented.

With reference to FIG. 4, an example operator graph 400 represents a stream computing application beginning from one or more source PE's 402 through to one or more sink PE's. 410. Data elements flow into a source PE 402 of a stream application and are processed by source PE 402. Typically, PE's receive an N-tuple of data elements from the stream as well as emit an N-tuple of data elements into the stream (except for a sink PE where the stream terminates). Moreover, the N-tuple received by a PE need not be the same N-tuple sent downstream, and in some embodiments, the PE's are configured to receive or emit data in formats other than an N-tuple. Additionally, in other embodiments, each PE is configured to carry out any form of data processing functions on the received tuple, including, e.g., writing to database tables or performing other database operations such as data joins, splits, reads, etc., as well as performing other data analytic functions or operations.

As shown in example operator graph 400, additional PE's (i.e., operators) form part of the data flow. For example, the data flows from source PE 402 to a PE representing an operator "A" 404. According to the example embodiment shown in FIG. 4, operator "A" includes a replication of five copies (1)-(5) of the operator "A" 404*a-e*, which are respectively deployed in parallel channels 406*a-e* and collectively form a parallel region 405. In contrast to parallel region 405, data flows from parallel channels 406*a-e* flow to a PE representing another operator type, operator "B" 408, which notably has not been replicated in this example. The data process flows from PE 408 to sink PE 410. With respect parallel region 405, it should be noted that replicated operators 404*a-e* may be distributed across one or more processing nodes 306*a-d*. According to an embodiment where the above distribution of operators 404*a-e* is present, replicated operators 404*a-e* would be respectively associated with their own physical and/or virtual address, as well as being associated with their own debugging port in the event that a debugging operation of data flows through operators 404*a-e* is performed.

With reference to FIG. 5, a more detailed view of the processing node 306 of FIG. 3 is shown in which illustrative embodiments may be implemented. As shown, the processing node 306 includes, without limitation, a central processing unit (CPU) 505, a network interface 515, an interconnect 520, a memory 525, and storage 530. The processing node 306 may also include an I/O devices interface 510 used to connect I/O devices 512 (e.g., keyboard, display and mouse devices) to the processing node 306.

The CPU 505 retrieves and executes programming instructions stored in the memory 525. Similarly, the CPU 505 stores and retrieves application data residing in the memory 525. The interconnect 520 is used to transmit programming instructions and application data between the CPU 505, I/O devices interface 510, storage 530, network interface 515, and memory 525. CPU 205 is included to be representative of a single CPU, multiple CPUs, a single CPU having multiple processing cores, and the like. And the memory 525 is generally included to be representative of a random-access memory. Storage 530, such as a hard disk drive, solid state device (SSD), or flash memory storage drive, may store non-volatile data.

In this example, the memory 525 includes a debugger application 550, PE's 555 including a collection of operators 556 and stream connection data 560. As noted above, each operator 556 may provide a small chunk of executable code configured to process data flowing into a processing element (e.g., PE 555) and to emit data to other operators 556 in that PE and to other PEs in the stream computing application. Such PEs may be on the same processing node 306 or on other processing nodes accessed over the data communications network 302. The stream connection data 560 represents the connections between PEs on processing node 306 (e.g., a TCP/IP socket connection between PE's, as well as connections to other processing nodes 306 with upstream and/or downstream PEs in the stream application, also via TCP/IP sockets (or other inter-process data communication mechanisms).

Storage 530 includes buffered stream data 570, debug data 575, and consolidated operator graph 580. Buffered stream data 570 represents a storage space for data flowing into the processing node 306 from upstream PE's (or from a data source for the stream application). For example, buffered stream data 570 may include data tuples waiting to be processed by one of the PEs 555 (i.e., which can include fused and unfused PE's). Buffered stream data 570 may also store the results of data processing performed by PE's 555 that will be sent to downstream PE's 555. Consolidated operator graph 580 represents a single-pane view of a set of active PE's 555 in a distributed stream computing application executed across a plurality of mutually remote processing nodes 306*a-d*. Consolidated operator graph 580 is created based on attachment information collected by SCMS 304 discussed in greater detail below in reference to FIG. 6.

The debugger 550 provides a software application configured to allow a developer to debug PE 555 running on the processing node 306. For example, the debugger 550 may be used to set breakpoints, to execute instructions step into (or over) function calls in the instructions, to inspect variables, etc., as well as provide a variety of other functions and/or features used for debugging the PE 555. In context of the present invention, the debugger 550 may be configured to selectively fuse and un-fuse PE's (or otherwise modify a state of the stream computing application) to facilitate the debugging process. In one embodiment, e.g., the debugger 550 may fuse and un-fuse PE's as specified by the developer. Alternatively, the debugger 550 may be configured to propose a stream computing state for debugging a given PE 555 (or given multiple PE's). To do so, the developer analyzes a consolidated operator graph 580 as well as a distribution of PE's across a collection of processing nodes 306*a-d* in order to determine how to modify the operator graph 580 associated with a stream computing application. In addition to fusing and un-fusing PE's 555, the debugger 550 may modify the running state of the stream computing application by, e.g., halting (or limiting) data flows across a PE being debugged, specifying data exempt from the debugging process, duplicating PE's 555 to create a debug copy of a PE, or performing other actions to allow a processing element(s) to be debugged.

With reference to FIG. 6, a more detailed view of the SCMS 306 of FIG. 3 is shown in which illustrative embodiments may be implemented. As shown, SCMS 304 includes, without limitation, a central processing unit (CPU) 605, a network interface 615, an interconnect 620, a memory 625, and a storage 630. The SCMS 304 may also include an I/O device interface 610 connecting I/O devices 612 (e.g., keyboard, display and mouse devices) to the SCMS 304.

Like CPU 505 of FIG. 5, CPU 605 is configured to retrieve and execute programming instructions stored in the memory 625 and storage 630. Similarly, the CPU 605 is configured to store and retrieve application data residing in the memory 625 and storage 630. The interconnect 620 is configured to move data, such as programming instructions and application data, between the CPU 605, I/O devices interface 610, storage unit 630, network interface 615, and memory 625. Like CPU 505, CPU 605 is included to be representative of a single CPU, multiple CPUs, a single CPU having multiple processing cores, and the like. Memory 625 is generally included to be representative of a random-access memory. The network interface 615 is configured to transmit data via the communications network 302. Although shown as a single unit, the storage 630 may be a combination of fixed and/or removable storage devices, such as fixed disc drives, removable memory cards, optical storage, SSD or flash memory devices, network attached storage (NAS), or connections to storage area-network (SAN) devices.

As shown, the memory 625 stores a stream computing debugger 650, a stream computing compiler 655, and a stream computing manager 660. The storage 630 includes a PE/operator source code 670 and state database (DB) 675. As noted above, the stream computing debugger 650 may be used to manage the debugging of a PE on one or more of the processing nodes 306*a-d*. For example, according to one embodiment, the stream debugger 650 determines whether one PE should be fused (or un-fused) with other PE's. In such case, the stream computing debugger 650 determines (from the attachment data used to create consolidated operator graph 580) that a large group of PE's have been fused on one processing node, but that debugging breakpoints are included in only few of the PE's. In such a case, the stream computing debugger 650 could decide to un-fuse the PEs with the breakpoints from a larger group. In one embodiment, the stream computing debugger 650 un-fuses the PE by invoking the stream computing compiler 655 to recompile elements of the PE/operator source code 670 as needed. In one example, the PE's with breakpoints could be recompiled into a first PE, and the remaining PE's (from the fused PE) are recompiled into a second PE. Once prepared, the stream computing manager 660 may remove the fused PE from the running stream and replace it with the first PE and the second PE generated by the stream computing compiler 655. Thereafter, breakpoints in the first PE are hit, the first PE stops executing without disrupting any processing performed by the second PE.

According to one embodiment, stream computing manager 660 keeps track of which processing node(s) 306*a-d* execute particular PE's, the location of each processing node 306*a-d*, opens a debugging port for a remote debugger 550 to attach to the PE(s) 555, and facilitates a remote debugger program 550 to dynamically attach to PEs 404*a-e* of distributed parallel channels 406*a-e* through a particular debugging port. According to another embodiment, stream computing manager 660 communicates a list of PE's to a debugging interface (not shown) of debugger 550 at a developer side, enables remote debugging for a PE 555 selected by a developer setting a debugging breakpoint for the PE(s) drawn from the communicated list, performs a lookup of the PE and maps the PE to attachment information in the distributed environment, and dynamically attaches the remote debugger based on the attachment information. According to another embodiment, stream computing manager 660 communicates to a debugging interface of debugger 550 a consolidation of a set of active PE's of a stream computing application to create a consolidated operator graph 580 having the single-pane view of PE's executed across a plurality of mutually remote processing nodes 306*a-d*. According to another embodiment, the stream computing manager 660 monitors state changes in debugging operations at runtime, stores the state changes in a state DB 675, and automatically sends reattachment information to the remote debugger 550 upon detection of the state change. According to another embodiment, the stream computing manager 660 responds to a developer's setting of a debugging breakpoint for a PE in instances when the selected PE has replicated into a set of identical operators (as shown in FIG. 4), sends a notification of the replicated state of the PE and requests additional clarification regarding whether the developer intended to set breakpoints on all or a subset of the PE's intended for debugging, and acquires the correct attachment information to cause attachment to the intended PE replicate(s) upon receipt of the additional clarification.

Figure 7:
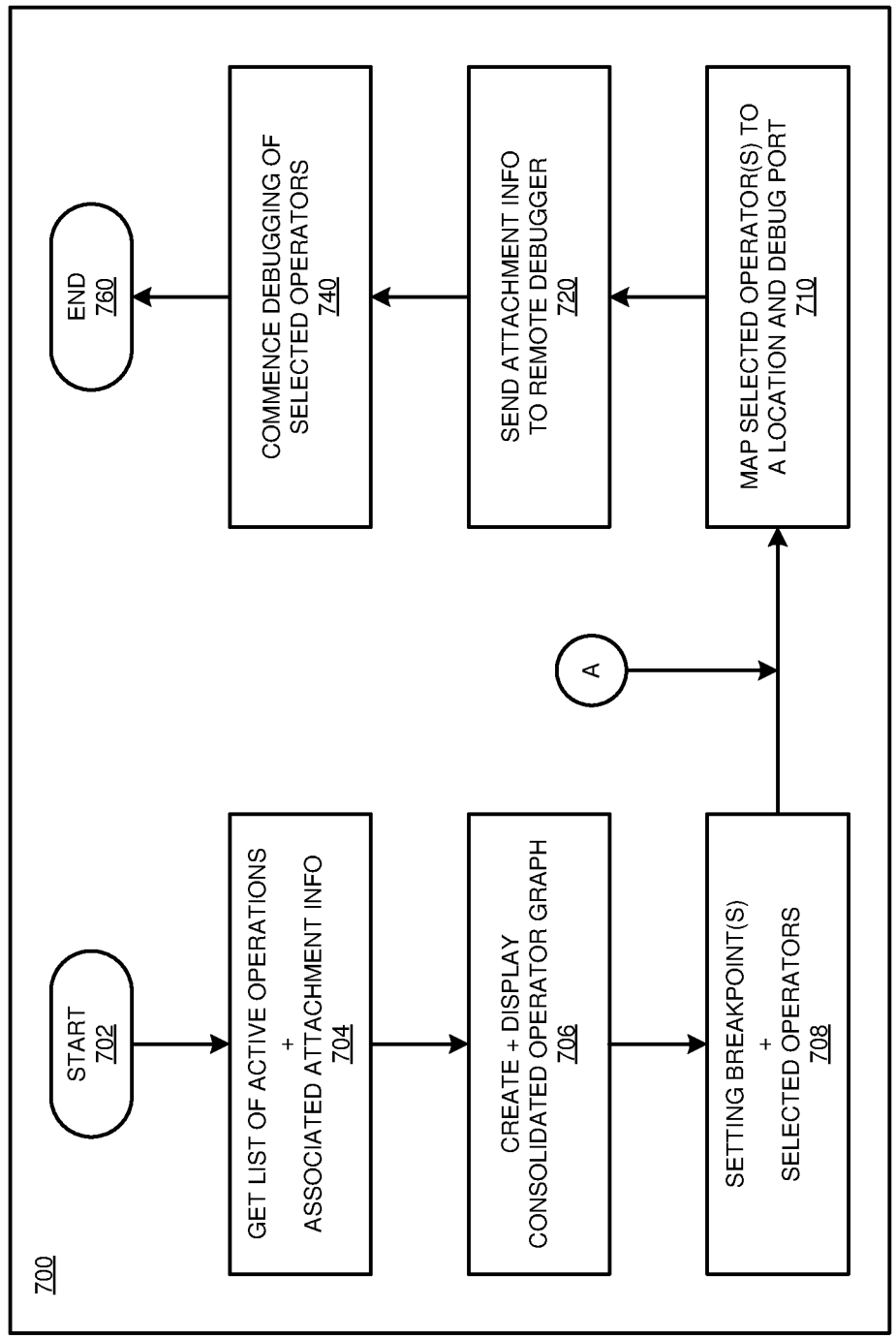
FIG. 7 depicts a flowchart of a process for remote debugging parallel regions in a stream computing application, in accordance with an illustrative embodiment.

With reference to FIG. 7, this figure depicts a flowchart of an example process 700 for automatically setting up debug server settings for PE processes. The process begins at block 702 and proceeds to block 704, where a developer receives a list of active operators and associated attachment information (i.e., location of PE's in particular processing node(s) and debugging port to allow attachment of remote debugger to the PE's). From block 704, the process continues to block 706, where stream computing manager 660 creates a consolidated operator graph that is sent to processing node 306 for display to a developer. Having the consolidated operator graph 580 displayed to developer, the process continues to block 708 where the developer sets breakpoint(s) at selected operator(s) on consolidated operator graph 580. The process continues to block 710, where stream computing manager 660 maps the selected operator(s) to a location and debugging port (collectively referred to as "attachment information"). The SCMS 304 transmits the attachment information via the network 302 to the remote debugger 550 of processing node 306 (block 720). The attachment information is used to facilitate attachment to the selected operators to enable debugging of the running processing of data through the selected operator(s). The process ends at block 760.

Figure 8:
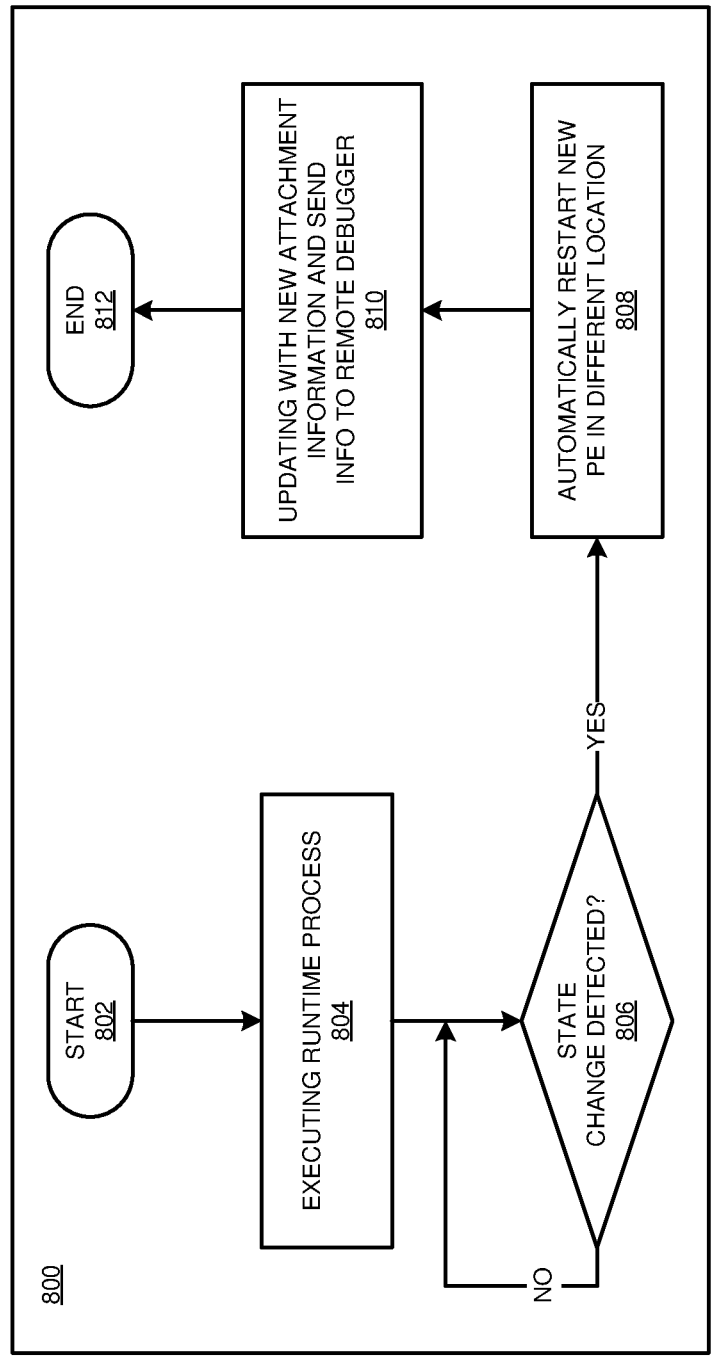
FIG. 8 depicts a flowchart of an example process for handling resumption of debugging after a state change, in accordance with an illustrative embodiment.

With reference to FIG. 8, this figure depicts a flowchart of an example process 800 for handling resumption of debugging after a state change (i.e., termination of process during runtime, change in parallel region width, refusion of PE's during runtime). The process begins at block 802 and proceeds to block 804, where a PE is executing in a runtime process of the stream computing application. The process continues to decision block 806, where a determination is made whether a state change has been detected by stream computing manager 660. If it is determined that a state change has not been detected, the process returns to decision block 806 for continued monitoring for state changes. However, if it is determined that a state change has been detected the process continues to block 808, where stream computing manager 660 automatically restarts the new PE in a different location than the location where the state change occurred. Stream computing manager 660 updates the new attachment information associated with the new PE and sends the updated attachment information to remote debugger for attachment to the new PE (block 810). The process ends at block 812.

Figure 9:
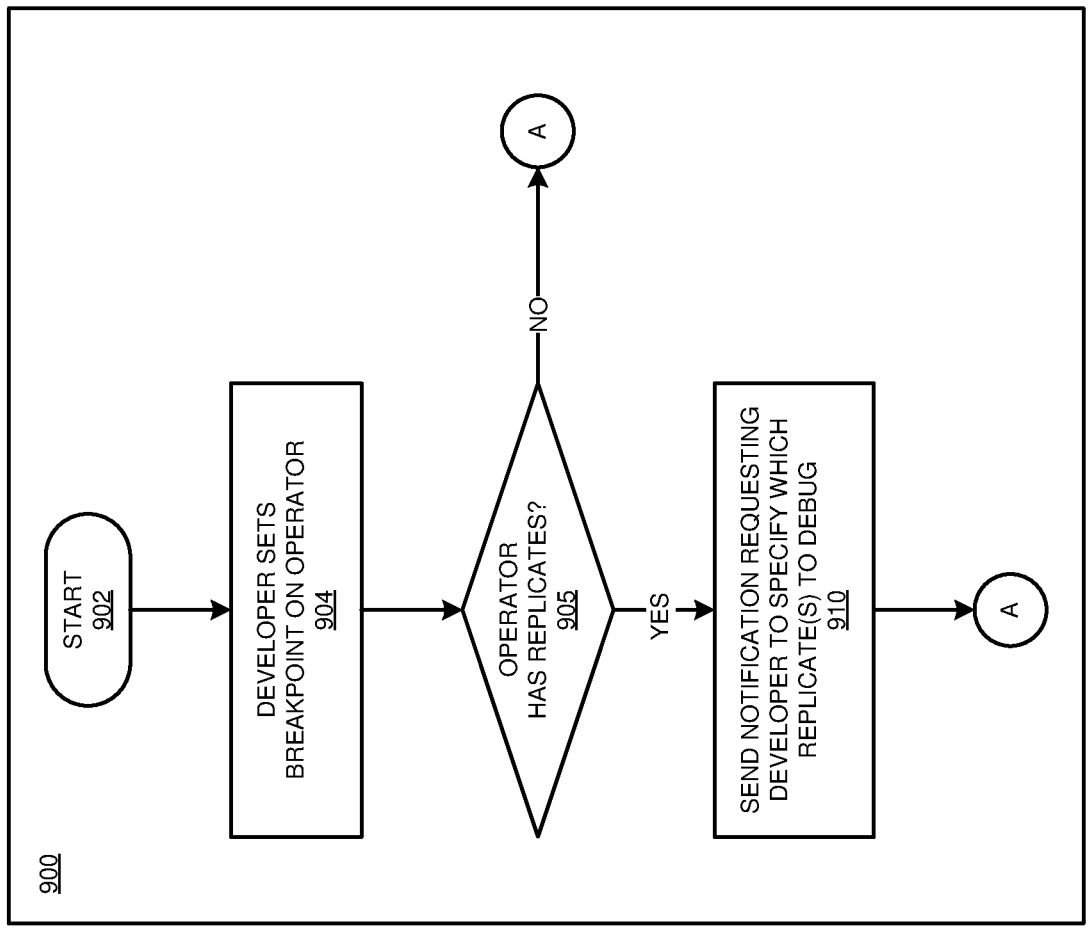
FIG. 9 depicts a flowchart of an example process for handling the debugging of a selected operator that has replicates, in accordance with an illustrative embodiment.

With reference to FIG. 9, this figure depicts a flowchart of an example process 900 for handling the debugging of a selected operator that has replicates. The process begins at block 902, where the developer sets a breakpoint on an operator. From block 902, the process continues to decision block 905, where a determination is made whether the selected operator for debugging has replicates. If the breakpoint is set on an operator that does not have replicates, the process flows to connecting block "A", which continues at FIG. 7. However, if the breakpoint is set on an operator that has replicates, the process continues to block 910, where stream computing manager 660 sends a notification requesting that developer further specify which one or ones of the replicated operators the developer wishes to debug. From block 910, the process flows to connecting block "A", which continues at FIG. 7.

Thus, a computer implemented method, system or apparatus, and computer program product are provided in the illustrative embodiments for remote debugging parallel regions in stream computing applications and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, such as a computer-readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
communicating, by a stream computing management server (SCMS), a list of processing elements to a debugging interface;
receiving, by the SCMS, a command to enable remote debugging for a processing element of the list of processing elements, wherein the processing element is a part of a parallel channel in a parallel region of a distributed processing environment, the parallel region having replicated operators;
mapping, by the SCMS, the processing element to an attachment information in the distributed environment; and
attaching dynamically, by the SCMS, a remote debugger to the processing element based on the attachment information; and
reattaching automatically, responsive to detecting a change in a state of runtime execution of the processing element, the remote debugger to the processing element, wherein the processing element has relocated from a first distributed location to a second distributed location after the change in the state.

2. The method of claim 1, further comprising:
communicating to the debugging interface a consolidation of a set of active processing elements of a stream computing application to cause a single-pane view of the set of active processing elements in a distributed stream computing application executed across a plurality of mutually remote processing nodes.

3. The method of claim 1, wherein the attachment information comprises at least one of a location of the processing element and a debugging port of the processing element.

4. The method of claim 1, further comprising:
determining that the processing element is replicated into a set of identical operators:
sending a notification of a replicated state of the processing element; and
receiving a selection of at least one identical operator from the set of identical operators for selectively attaching the remote debugger to a subset of the plurality of identical operators.

5. The method of claim 1, wherein the change in the state of the runtime execution of the processing element includes at least one of an abnormal termination of the processing element, a runtime refusion of processing elements, and a change in a number of parallel channels of a parallel region.

6. The method of claim 1, wherein the reattaching occurs without the SCMS communicating the attachment information to the user.

7. The method of claim 1, wherein the distributed processing environment includes a plurality of computing host devices, each computer host device characterized as at least one member from a set comprising a physical machine, a virtual machine, or a container.

8. A computer system, the computer system comprising one or more processors, one or more computer-readable memories, and one or more computer-readable storage devices, and program instructions stored on at least one of the one or more computer-readable storage devices for execution by at least one of the one or more processors via at least one of the one or more computer-readable memories, the stored program instructions comprising:
program instructions to communicate, by a stream computing management server (SCMS), a list of processing elements to a debugging interface;
program instructions to receive, by the SCMS, a command to enable remote debugging for a processing element of the list of processing elements, wherein the processing element is a part of a parallel channel in a parallel region of a distributed processing environment, the parallel region having replicated operators;
program instructions to map, by the SCMS, the processing element to an attachment information in the distributed environment; and
program instructions to attach dynamically, by the SCMS, a remote debugger to the processing element based on the attachment information; and
program instructions to reattach automatically, responsive to detecting a change in a state of runtime execution of the processing element, the remote debugger to the processing element, wherein the processing element has relocated from a first distributed location to a second distributed location after the change in the state.

9. The computer system of claim 8, further comprising:
further comprising:
program instructions to communicate to the debugging interface a consolidation of a set of active processing elements of a stream computing application to cause a single-pane view of the set of active processing elements in a distributed stream computing application executed across a plurality of mutually remote processing nodes.

10. The computer system of claim 8, wherein the attachment information comprises at least one of a location of the processing element and a debugging port of the processing element.

11. The computer system of claim 8, further comprising:
program instructions to determine that the processing element is replicated into a set of identical operators;
program instructions to send a notification of a replicated state of the processing element; and
program instructions to receive a selection of at least one identical operator from the set of identical operators for selectively attaching the remote debugger to a subset of the plurality of identical operators.

12. The computer system of claim 8, wherein the change in the state of the runtime execution of the processing element includes at least one of an abnormal termination of the processing element, a runtime refusion of processing elements, and a change in a number of parallel channels of a parallel region.

13. The computer system of claim 8, wherein the reattaching occurs without the SCMS communicating the attachment information to the user.

14. The computer system of claim 8, wherein the distributed processing environment includes a plurality of processing nodes, each processing node characterized as at least one member from a set comprising a physical machine, a virtual machine, or a container.

15. A computer program product comprising one or more computer-readable storage devices, and program instructions stored on at least one of the one or more computer-readable storage devices, the stored program instructions comprising:
    program instructions to communicate, by a stream computing management server (SCMS), a list of processing elements to a debugging interface;
    program instructions to receive, by the SCMS, a command to enable remote debugging for a processing element of the list of processing elements, wherein the processing element is a part of a parallel channel in a parallel region of a distributed processing environment, the parallel region having replicated operators;
    program instructions to map, by the SCMS, the processing element to an attachment information in the distributed environment; and
    program instructions to attach dynamically, by the SCMS, a remote debugger to the processing element based on the attachment information; and
    program instructions to reattach automatically, responsive to detecting a change in a state of runtime execution of the processing element, the remote debugger to the processing element, wherein the processing element has relocated from a first distributed location to a second distributed location after the change in the state.

16. The computer program product of claim 15, the stored program instructions further comprising program instructions to communicate to the debugging interface a consolidation of a set of active processing elements of a stream computing application to cause a single-pane view of the set of active processing elements in a distributed stream computing application executed across a plurality of mutually remote processing nodes.

17. The computer program product of claim 15, the stored program instructions further comprising:
    program instructions to determine that the processing element is replicated into a set of identical operators;
    program instructions to send a notification of a replicated state of the processing element; and
    program instructions to receive a selection of at least one identical operator from the set of identical operators for selectively attaching the remote debugger to a subset of the plurality of identical operators.

* * * * *